United States Patent
Fan et al.

(10) Patent No.: US 11,377,519 B1
(45) Date of Patent: Jul. 5, 2022

(54) HIGH GLASS TRANSITION TEMPERATURE EPOXY FORMULATIONS FOR CRYOGENIC APPLICATIONS

(71) Applicant: Space Exploration Technologies Corp., Hawthorne, CA (US)

(72) Inventors: Wenhong Fan, Cupertino, CA (US); Ryan Christopher Kennett, Manhattan Beach, CA (US); Joshua James Conlon, Redondo Beach, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 215 days.

(21) Appl. No.: 16/404,979

(22) Filed: May 7, 2019

Related U.S. Application Data (60) Provisional application No. 62/674,220, filed on May 21, 2018.

(51) Int. Cl.

| | | |
|---|---|---|
| *F17C 1/16* | (2006.01) | |
| *C08J 5/24* | (2006.01) | |
| *C08G 59/24* | (2006.01) | |
| *C08G 59/50* | (2006.01) | |
| *C08L 63/02* | (2006.01) | |
| *C08K 5/1515* | (2006.01) | |
| *C08L 63/00* | (2006.01) | |

(52) U.S. Cl.
CPC ......... *C08G 59/245* (2013.01); *C08G 59/504* (2013.01); *C08G 59/5006* (2013.01); *C08G 59/5026* (2013.01); *C08J 5/24* (2013.01); *C08K 5/1515* (2013.01); *C08L 63/00* (2013.01); *F17C 1/16* (2013.01); *C08J 2363/02* (2013.01); *C08L 2205/16* (2013.01); *F17C 2201/0109* (2013.01); *F17C 2203/0604* (2013.01); *F17C 2203/0619* (2013.01); *F17C 2203/0636* (2013.01); *F17C 2203/0673* (2013.01); *F17C 2221/014* (2013.01); *F17C 2223/0161* (2013.01); *F17C 2270/0168* (2013.01)

(58) Field of Classification Search
CPC .. C08G 59/24; C08G 59/245; C08G 59/5006; C08G 59/5026; C08G 59/504; C08L 63/00; C08J 5/24; F17C 1/16
USPC .............................. 523/428; 428/297.4, 418
See application file for complete search history.

(56) References Cited

U.S. PATENT DOCUMENTS

| | | | | |
|---|---|---|---|---|
| 2,897,179 | A * | 7/1959 | Shechter | C08G 59/5026 528/122 |
| 3,708,567 | A * | 1/1973 | Hampel | C08G 18/3212 264/331.12 |
| 2018/0186946 | A1* | 7/2018 | Mori | C08G 59/3218 |
| 2019/0100616 | A1* | 4/2019 | Zhou | C08G 59/5073 |

FOREIGN PATENT DOCUMENTS

| | | | | |
|---|---|---|---|---|
| CN | 101735564 | A * | 6/2010 | ............. C08G 59/14 |
| GB | 1169121 | A * | 10/1969 | ............. B29D 12/02 |
| WO | WO-2017218934 | A1 * | 12/2017 | ......... C08G 59/5013 |

OTHER PUBLICATIONS

Machine translation of CN-101735564-A (no date).*

* cited by examiner

*Primary Examiner* — Michael J Feely
(74) *Attorney, Agent, or Firm* — Polsinelli PC

(57) ABSTRACT

A method of increasing the glass transition point of a cured epoxy comprising a bisphenol A diglycidyl ether and a polyetheramine includes the step of including 1,8-diamino-p-menthane as an additional hardener for curing the epoxy. An epoxy formulation includes bisphenol A diglycidyl ether and a hardener including a polyetheramine and 1,8-diamino-p-menthane.

21 Claims, 2 Drawing Sheets

HIGH GLASS TRANSITION TEMPERATURE EPOXY FORMULATIONS FOR CRYOGENIC APPLICATIONS

CROSS-REFERENCE TO RELATED APPLICATION

This application claims the benefit of Provisional Application No. 62/674,220, filed May 21, 2018, the entire contents of which are incorporated herein in their entirety.

BACKGROUND

A composite over-wrapped pressure vessel (COPV) is an alternative to a pressure vessel made entirely of metal where the primary concern is weight. A composite overwrapped pressure vessel has a thin inside metal liner to assist with fabrication of the composite overwrapped pressure vessel. The metal liner provides little of the load bearing ability of the composite overwrapped pressure vessel. The composite overwrapped pressure vessel is strengthened by wrapping the metal liner with a composite of fibers and an epoxy resin on the exterior. Fibers can include one or more types, such as glass, carbon, KEVLAR, and the like. Because of their lower weight, composite overwrapped pressure vessels are used in launch vehicles to hold the liquid propellants, such as liquid oxygen and methane. In this service, the composite overwrapped pressure vessels are exposed to an extreme range in temperature as well as simultaneous thermal and mechanical cycling.

In a pressure-fed launch vehicle engine, helium pressurization is used to force the liquid oxygen and liquid fuel propellants from their respective holding tanks to the combustion chamber. Since these propellant tanks make up the bulk of the vehicles structure, by default the composite overwrapped pressure vessel (COPVs) which store the helium need to be immersed in either the liquid oxygen or liquid fuel. In addition to being able to survive these very cold temperatures, the composite overwrapped pressure vessels can experience heating to as much as 200° F. or more due to adiabatic heating during pressurization. This harsh environment requires the epoxy composites of the composite overwrapped pressure vessels to have a high strength at cryogenic temperatures and to be able to maintain the strength and dimensional stability from cryogenic temperatures to high temperatures caused by adiabatic heating by being pressurized to 5,500 psi or more.

Currently, the epoxies that are used in cryogenic applications generally have a low glass transition temperature (Tg). This is because the epoxy needs to have a lower crosslinking density in order to maintain flexibility for good elongation at cryogenic temperatures. However, high Tg and cryo flexibility are often conflicting requirements. A high Tg is often related to stiffer molecular structures that are brittle and have low elongation. Strength properties of epoxies at high temperatures can be proportional to Tg, but the elongation is often inversely proportional to Tg.

Accordingly, this disclosure addresses the foregoing problem by providing an epoxy composite that can be used in composite overwrapped pressure vessels to provide the needed elongation and strength properties throughout a temperature range of about −360° F. to about 220° F. at a pressure of about 5,500 psi or more.

SUMMARY

Embodiments of the epoxy composition have a high glass transition point without relying on increased crosslinking density unlike the conventional epoxies that increase the glass transition point by increasing crosslinking. This allows embodiments of the epoxy composition to attain high strength and high elongation from cryogenic temperatures of about −360° F. to about 240° F. In an embodiment, cryogenic temperatures refers to the temperature at or below the boiling point of liquid nitrogen (−320° F.) or liquid oxygen (−297° F.). In an embodiment, the epoxy compositions have glass transition point (Tg) greater than or equal to 220° F., greater than or equal to 250° F., or greater than or equal to 280° F. In an embodiment, the epoxy compositions have an elongation of greater than 2% at cryogenic temperatures. In an embodiment, the epoxy compositions have a strength of greater than 18 ksi at cryogenic temperatures. In an embodiment, the uncured epoxy compositions have a gel life of greater than 8 hours and a viscosity of less than 10,000 cps.

In one embodiment, a method of increasing the glass transition point of a cured epoxy comprising a glycidyl ether resin and a polyetheramine, wherein the method comprises including 1,8-diamino-p-menthane as an additional hardener for curing the epoxy.

In one embodiment, the ratio of polyetheramine to 1,8-diamino-p-menthane is 1:2.5±10% by weight.

In one embodiment, the glass transition point of the cured epoxy is at least 280° F.

In one embodiment, an uncured epoxy formulation, comprises a glycidyl ether resin; and a hardener including a polyetheramine and 1,8-diamino-p-menthane.

In one embodiment, the glycidyl ether resin is 2,2-bis[p-(2,3-epoxypropoxy)phenyl]propane.

In one embodiment, the ratio of the polyetheramine to 1,8-diamino-p-menthane is 1:2.5±10% by weight.

In one embodiment, the ratio of the glycidyl ether resin to hardener is 100:28±10% by weight.

In one embodiment, the viscosity of uncured epoxy is greater than 3,000 cps.

In one embodiment, the gel life of uncured epoxy is at least 24 hours at ambient temperature (about 73° F.) and at least 10 hours at 120° F.

In one embodiment, the uncured epoxy formulation comprises an additive.

In one embodiment, the additive is propoxylated glycerin triglycidyl ether or brominated bisphenol A diglycidyl ether.

In one embodiment, the glycidyl ether resin and the hardener of a polyetheramine and 1,8-diamino-p-menthane comprise about 100% by weight of the epoxy formulation.

In one embodiment, the cured epoxy formulation comprises the cured product of a glycidyl ether resin, and a hardener of a polyetheramine and 1,8-diamino-p-menthane.

In one embodiment, the cured epoxy has a glass transition point at about 280 F or greater.

In one embodiment, the cured epoxy comprises a density of 1.14 g/cm$^3$.

In one embodiment, the cured epoxy comprises a hardness of 82 shore D.

In one embodiment, the cured epoxy comprises a tensile strength of about 22.6+/−2.6 ksi at −320° F.

In one embodiment, the cured epoxy comprises a tensile elongation of about 2.6+/−0.5% at −320° F.

In one embodiment, the cured epoxy further comprises fibers.

In one embodiment, the fibers comprise carbon, glass, aromatic polyamide, or a combination thereof.

In an embodiment, about 100% by weight of the cured or uncured epoxy formulation comprises a glycidyl ether resin and 1,8-diamino-p-menthane.

In one embodiment, the ratio of the glycidyl ether resin to 1,8-diamino-p-menthane is 100:32±10% by weight.

In one embodiment, about 100% by weight of a cured or uncured epoxy formulation comprises a glycidyl ether resin; and 4,4'-methylenebis(2-methylcyclohexylamine).

In one embodiment, the ratio of the glycidyl ether resin to 4,4'-methylenebis(2-methylcyclohexylamine) is 100:32±10% by weight.

In one embodiment, a composite overwrapped pressure vessel comprises a metal liner overwrapped with fibers impregnated with the cured product of a glycidyl ether resin; and a hardener of a polyetheramine and 1,8-diamino-p-menthane.

In one embodiment, the composite overwrapped pressure vessel has a burst pressure of at least 8,000 psi.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While the concepts of the present disclosure are susceptible to various modifications and alternative forms, specific embodiments thereof have been shown by way of example and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As mentioned before, composite overwrapped pressure vessels are used in launch vehicles because of the weight savings compared to a metal pressure vessel. However, composite overwrapped pressure vessels still include a metal inner liner usually made of aluminum, titanium, or steel. The epoxy fiber composite is then overwrapped on the exterior of the inner liner.

When the composite overwrapped pressure vessel is pressurized to high pressures, the composite overwrap experiences large strains that could cause microcracks, local fracturing, or even catastrophically fail due to the brittle nature of fiber based composites. This situation is aggravated by cryogenic temperatures as all polymers, including epoxies, undergo a transition at temperatures around −150 C or higher where the polymer becomes much stiffer, increasing in modulus and decreasing in elongation. For these reasons, a particular set of epoxies can be used for composite overwrapped pressure vessel applications, and the common traits of this group of epoxies are that they have flexible structures, which are typically associated with lower degree of cross linking. It is also typical for molecules with flexible structures to have lower glass transition (Tg). When temperatures increase close to the Tg, the polymers, including epoxies, start to lose strength and modulus, at some point (still below the Tg), the composites are considered unusable for any load carrying or structural applications. Thus, for this class of applications where the composites need to perform at both cryo (very low) temperatures and high temperatures (for example, 200° F. or above), there is a need to develop epoxies with good cryo elongation properties as well as high Tg, preferably higher than 250° F.

Furthermore, composite overwrapped pressure vessels can experience a wide temperature difference within the same vessel. For example, in helium pressurization of liquid oxygen and fuel tanks, the tanks need to be filled quickly with helium. However, the speed at which the tanks need to be filled with helium can raise the temperature of a section of the composite overwrap while the composite overwrapped pressure vessel contains the liquid oxygen or fuel at cryogenic temperatures.

Accordingly, the present disclosure relates to an epoxy formulation that has high elongation and high strength over a greater temperature range not achieved with conventional epoxies.

In an embodiment, a formulation for an epoxy uses a class of hardeners that yield epoxies with high glass transition points without relying on increased crosslinking. Conventionally, increasing the crosslinking density has been the most common approach for raising Tg, however, this results in diminished elongation properties. Embodiments of this disclosure have strength over a broader temperature range associated with increasing Tg, but still retain elongation properties at cryogenic temperatures.

Embodiments of uncured and cured epoxy formulations of this disclosure comprise an epoxy resin(s), Part A, and a hardener(s), Part B. In an embodiment, the resin part A optionally includes one or more resins. In an embodiment, the hardener part B optionally includes one or more amines. In an embodiment, the hardener part B optionally includes one or more polyetheramines. In some embodiments, the epoxy resin part A and the hardener part B comprise about 100% by weigh of the epoxy composition. In some embodiments, the epoxy compositions can further include additives.

Epoxy Resins, Part A

In an embodiment, the epoxy resins are chosen from among resins that include one or more epoxide functional groups. In an embodiment, the epoxy resins include glycidyl ethers. A glycidyl ether group has the formula (—O—$C_3H_5O$). A family of epoxy resins is known as glycidyl ethers.

In an embodiment, the epoxy resin(s) is an aromatic glycidyl ether, an aliphatic glycidyl ether, or a combination. The aliphatic glycidyl ethers can include cyclic and branched glycidyl ethers.

In one embodiment, the epoxy resin(s) includes an aromatic diglycidyl ether, such as bisphenol A diglycidyl ether represented by the following formula (E1):

wherein n=0 to 25. One embodiment of a commercially available epoxy resin (E1) is known under the designation of D.E.R.™ 383 Epoxy Resin by the Dow Chemical Co. D.E.R.™ 383 appears to have n=0, specifically the polymer is 2,2-bis[p-(2,3-epoxypropoxy)phenyl]propane and has the CAS number 25085-99-8. In some embodiments, the epoxy resin(s) includes aliphatic glycidyl ethers.

In one embodiment, the epoxy resin(s) includes an aromatic diglycidyl ether, such as bisphenol F diglycidyl ether represented by the following formula (E2).

In one embodiment, an aliphatic glycidyl ether is represented by the formula (E3). E3 has the chemical name 1,8-bis(oxiran-2-ylmethoxy)octane.

In one embodiment, an aliphatic glycidyl ether is represented by the formula (E4). E4 has the name 2,2' #(2,2-dimethylpropane-1,3-diyl)bis(oxy)bis(methylene))bis(oxirane).

In one embodiment, an aliphatic glycidyl ether is represented by the formula (E5). The aliphatic glycidyl ether (E5) is 1,4-butanediol diglycidyl ether.

In one embodiment, the epoxy resin(s) includes branched/multi-epoxy functional glycidyl ethers. Representative epoxy resins are known by the designation ERISYS®.

The family of ERISYS® epoxies may include, but is not limited to, the following: ERISYS® GE 20 (Neopentyl Glycol Diglycidyl Ether); ERISYS® GE 22 (Cyclohexanedimethanol Diglycidyl Ether); ERISYS® GE 31 (Trimethylolethane Triglycidyl Ether); ERISYS® GE 35 (Castor Oil Triglycidyl Ether); ERISYS® GE 40 (epoxidized Pentaerythritol); ERISYS® EGDGE (Ethylene Glycol Diglycidyl Ether); ERISYS® GE 21 (1,4 Butanediol Diglycidyl Ether); ERISYS® GE 24 (Polypropylene Glycol DGE); ERISYS® GE 25 (1,6 Hexanediol Diglycidyl Ether); ERISYS® GE 30 (Trimethylolpropane Triglycidyl Ether); ERISYS® GE 35 H (Castor Oil Glycidyl Ether); ERISYS® GE 36 (Propoxylated Glycerin Triglycidyl Ether); ERISYS® GE 38 (Polyglycerol-3-Polyglycidyl Ether), and ERISYS® GE 60 (Sorbitol Polyglycidyl Ether).

In one embodiment, a branched glycidyl ether is represented by the formula (E6). The branched epoxy is commercially available under the designation ERISYS® GE-36. ERISYS® GE 36 is glycerol propoxylate triglycidyl ether is also shown and can be described by the formulas.

or

In some embodiments, the epoxy resin(s) includes glycidyl esters. In one embodiment, a cyclic aliphatic glycidyl ester is represented by the formula (E6). The cyclic aliphatic glycidyl ester (E6) is diglycidyl 1,2-cyclohexanedicarboxylate.

E6

In some embodiments, the epoxy resin(s) include one or more epoxide groups and one or more functional groups selected from ester, ketone, and ether. An epoxy resin is represented by the formula (E7). The cyclic aliphatic ether (E7) is 3,4-epoxycyclohexylmethyl-3',4' epoxycyclohexane carboxylate.

E7

Amine Hardeners, Part B

In one embodiment, the hardener part B includes one or more amines. In an embodiment, the amine is a polyetheramine.

In an embodiment, a polyetheramine is represented by the formula (A1). The amine (A1) is a diamine and is based on polypropylene glycol (PPG). The amine (A1) is commercially available, for example, from the Huntsman company under the designation Jeffamine® XTJ-568. XTJ-568 is a polyetherdiamine with a molecular weight of about 219. XTJ-568 has an amine hydrogen equivalent weight (g/eq) of about 55. The amine A1 is considered a monoethyleneglycol, polybutyleneoxide-diamine, and has a CAS No. 897393-42-9.

In one embodiment, a polyetheramine is represented by the formula (A2). The amine (A2) is known by the name: poly[oxy(methyl-1,2-ethanediyl)],α-hydro-ω-(2-aminomethylethoxy)-ether with 2-ethyl-2-(hydroxymethyl)-1,3-propanediol(3:1), has the CAS number 39423-51-3, and is commercially available, for example, from the Huntsman company under the designation Jeffamine® T-403.

A2 where, n+n+n is 5 to 6, and each n can be a different value.

In an embodiment, the hardener part B includes one or more cyclic amines. In one embodiment, a cyclic amine is represented by the formula (A3). The cyclic amine (A3) is 4,4'-methylenebis(2-methylcyclohexylamine).

A3

In one embodiment, a cyclic amine is represented by the formula (A4). The cyclic amine (A4) is aminoethylpiperazine.

A4

In one embodiment, a cyclic amine is represented by the formula (A5). The cyclic amine (A5) is 4,4'-methylenebix (cyclohexylamine).

A5

In one embodiment, a cyclic amine is represented by the formula (A6). The cyclic amine (A6) is 1,8-diamino menthane.

A6

Additives

In an embodiment, in addition to the epoxy resins and amine hardeners, the epoxy formulations of this disclosure can also include additives.

In an embodiment, an additive is known by the designation ERISYS®GE-36, which is propoxylated glycerin triglycidyl ether.

In an embodiment, an additive is brominated bisphenol A diglycidyl ether.

Epoxy Formulations

In some embodiments, the uncured and cured epoxy formulations include epoxy resin (part A) and hardener (part B) in about the following ratio (A to B) 100:28 by weight, wherein each part can vary by as much as ±10% by weight or in other embodiments only by as much as ±5% by weight. Good properties of epoxies depend on the exact stoichiom- etry, deviating away from the 1:1 stoichiometry often results in inferior properties (in both tensile strength/elongation as well as lower Tg).

In an embodiment, the hardener (part B) comprises two amines (A1 and A6), wherein A1 is a primary diamine, and A6 is 1,8-diamino-p-menthane. In an embodiment, the ratio of A1 to A6 is about 1:2.5 by weight, wherein each part can vary by as much as ±5%, ±10%, or ±15%, all percents given as weight percents.

In an embodiment, the epoxy formulations in accordance with this disclosure are cured at not more than 265° F., followed by a post cure at about 300° F. Depending on the resins, there might be adjustments to the cure temperature and length. However, with the disclosed class of resins, it is preferable to employ a post cure and slow temperature ramp to boost the burst performance. In an embodiment, the cure profile is any time and temperature from 3 to 5 hours and from 100° F. to 265° F. In an embodiment the cure ramp rate is 2° F. per minute. The cure profile may include holds at specific temperatures. For example, a cure profile may hold the temperature at 110° F. for 5 to 10 hours, ramp to a temperature of 180° F. and hold for 3 to 5 hours, ramp to a temperature of 265 F and hold for 3 to 5 hours.

In an embodiment, the post cure is any time and temperature from 3 to 10 hours and from 265° F. to 300° F. In an embodiment, the ramp rate for post cure is 1-2° F. per minute.

In an embodiment, the amine represented by formula A6:

is found to be useful as a hardener with epoxy resins, such as the glycidyl ethers, and particularly, the bisphenol A diglycidyl ethers. In an embodiment, the amine (A6) can be used as the sole hardener or in addition to a pre-existing hardener, such as polyetheramines, to modify the cured epoxy's properties.

In an embodiment, the hardener represented by the formula A6 (1,8-diamino menthane) is mixed with a conventional hardener of an epoxy resin to increase the cured epoxy resin's Tg. In an embodiment, the addition of the hardener, A6, extends the strength and elongation properties of conventional epoxy resins over a temperature range from cryogenic temperatures to about 300° F.

Conventional epoxies of bisphenol A diglycidyl ether cured with only polyetheramines have a disadvantage in that the tensile strength and elongation properties are limited when in services experiencing temperature ranges that extend to temperatures above 165 F or so, approaching their Tgs which are about 180-200 F. Polyetheramines are known to yield lowly cross linked epoxies with low Tg, but they are known for flexibility and good cryo performance. A problem is that the conventional epoxies tend to have a lower crosslinking density in order to maintain flexibility for good elongation at cryogenic temperatures. However, the lower crosslinking density results in sacrificing strength at higher temperatures because of the attendant lower Tg.

Accordingly, embodiments of a method are provided for increasing the glass transition point of a cured epoxy comprising a bisphenol A diglycidyl ether and a polyetheramine to achieve the desired elongation and strength over temperature ranges from cryogenic to above 250° F., the method comprises including 1,8-diamino-p-menthane as an additional hardener for curing the epoxy. In an embodiment, the polyetheramine is XTJ-568, and the bisphenol A diglycidyl ether is 2,2-bis[p-(2,3-epoxypropoxy)phenyl]propane.

Embodiments of the epoxy formulation include the uncured and cured (reacted) formulations.

In an embodiment, the uncured epoxy formulation comprises bisphenol A diglycidyl ether; and a hardener including a polyetheramine and 1,8-diamino-p-menthane. In an embodiment, the bisphenol A diglycidyl ether is 2,2-bis[p-(2,3-epoxypropoxy)phenyl]propane. In an embodiment, the polyetheramine is XTJ-568.

In an embodiment, the ratio of XTJ-568 to 1,8-diamino-p-menthane is 1:2.5±10% by weight. In other embodiments, the ratio of XTJ-568 to 1,8-diamino-p-menthane can range from 3:1 to 0:1. That is, 1,8-diamino-p-menthane can be the only hardener part B used in the epoxy composition.

In an embodiment, the ratio of bisphenol A diglycidyl ether to hardener is 100:28±10% by weight. In other embodiments, the ratio of bisphenol A diglycidyl ether to hardener is in the 100:25 to 100:30.

In an embodiment, the cured epoxy formulation comprises the cured product of bisphenol A diglycidyl ether, and a hardener of a polyetheramine and 1,8-diamino-p-menthane. In an embodiment, the bisphenol A diglycidyl ether is 2,2-bis[p-(2,3-epoxypropoxy)phenyl]propane. In an embodiment, the polyetheramine is XTJ-568.

In an embodiment, a ratio of XTJ-568 to 1,8-diamino-p-amenthane is 1:2.5±10% by weight. In other embodiments, the ratio of XTJ-568 to 1,8-diamino-p-menthane can range from 3:1 to 0:1. That is, 1,8-diamino-p-menthane can be the only hardener part B used in the epoxy composition.

In an embodiment, the ratio of bisphenol A diglycidyl ether to hardener is 100:28±10% by weight. In other embodiments, the ratio of bisphenol A diglycidyl ether to hardener is in the 100:25 to 100:30.

In an embodiment, the cured epoxy formulation has a glass transition point at about 280 F. In an embodiment, the epoxy formulation has a density of 1.14 g/cm$^3$. In an embodiment, the epoxy formulation has a hardness of 82 shore D. In an embodiment, the epoxy formulation has a tensile strength of about 22.6+/−2.6 ksi at −320° F. In an embodiment, the epoxy formulation has a tensile elongation of about 2.6+/−0.5% at −320° F.

In an embodiment, the uncured epoxy formulation has a viscosity greater than 3,000 cps. In an embodiment, the uncured epoxy formulation has a gel life of at least 24 hours at ambient temperature (about 73° F.) and a gel life of at least 10 hours at 120° F.

Variation 1: Bisphenol A: Additive: 1,8-diamino-p-menthane

In an embodiment, an epoxy formulation includes a bisphenol A diglycidyl ether, such as 2,2-bis[p-(2,3-epoxypropoxy)phenyl]propane, the additive ERISYS® GE 36, and the amine, 1,8-diamino-p-menthane. In an embodiment, the ratios of bisphenol A diglycidyl ether, such as 2,2-bis[p-(2,3-epoxypropoxy)phenyl]propane, ERISYS® GE 36, and the amine 1,8-diamino-p-menthane are 143:7:49±10% by weight.

Variation 2: Bisphenol A: Brominated Bisphenol A: XTJ-568; 1,8-diamino-p-menthane In an embodiment, an epoxy formulation includes a bisphenol A diglycidyl ether, such as 2,2-bis[p-(2,3-epoxypropoxy)phenyl]propane and brominated 2,2-bis[p-(2,3-epoxypropoxy)phenyl]propane in a ratio of 75:75 to 50:100 by weight, a polyetheramine, such as XTJ-568, and the amine 1,8-diamino-p-menthane. In an embodiment, the ratios of bisphenol A diglycidyl ether, such as 2,2-bis[p-(2,3-epoxypropoxy)phenyl]propane and brominated 2,2-bis[p-(2,3-epoxypropoxy)phenyl]propane, polyetheramine, such as XTJ-568, and the amine. 1,8-diamino-p-menthane is 150:9:23±10% by weight. In an embodiment, the ratios of bisphenol A diglycidyl ether, such as 2,2-bis[p-(2,3-epoxypropoxy)phenyl]propane and brominated 2,2-bis[p-(2,3-epoxypropoxy)phenyl]propane, polyetheramine, such as XTJ-568, and the amine, 1,8-diamino-p-menthane is 150:8:20±10% by weight.

Variation 3: Bisphenol A: 1,8-diamino-p-menthane

In an embodiment, an epoxy formulation includes a bisphenol A diglycidyl ether, such as 2,2-bis[p-(2,3-epoxypropoxy)phenyl]propane, and the amine 1,8-diamino-p-menthane. In an embodiment, the ratio of bisphenol A diglycidyl ether, such as 2,2-bis[p-(2,3-epoxypropoxy)phenyl]propane, to the amine 1,8-diamino-p-menthane is 100:32±10% by weight.

Variation 4: Bisphenol A: Cyclic Amine

In an embodiment, an epoxy formulation includes a bisphenol A diglycidyl ether, such as 2,2-bis[p-(2,3-epoxypropoxy)phenyl]propane, and the cyclic amine 4,4'-methylenebis(2-methylcyclohexylamine). In an embodiment, the ratio of bisphenol A diglycidyl ether, such as 2,2-bis[p-(2,3-epoxypropoxy)phenyl]propane, and the cyclic amine 4,4'-methylenebis(2-methylcyclohexylamine) is 100:33±10% by weight.

COPVs

In an embodiment, the epoxy formulations in accordance with this disclosure are used in the fabrication of composite overwrapped pressure vessels for cryogenic service including launch vehicles, for example. Toward that end, cured and uncured epoxy formulations can further comprise fibers including, but not limited to carbon, glass, aromatic polyamide (KEVLAR and like fibers), or a combination thereof. The fibers can be provided as woven, nonwoven, as a ribbon or tape, or as discrete filaments.

Composite overwrapped pressure vessels in accordance with this disclosure can be used to contain liquids or gases at very low temperatures. Liquids or gases can include, but are not limited to oxygen, methane, nitrogen, and helium. Cryogenic temperatures refer to a low temperatures, including, but not limited to temperatures ranges below −50° F., below −100° F., below −150° F., below −200° F., below −250° F., and below −350° F. In this disclosure, cryogenic service does not limit the composite overwrapped pressure vessel to only experiencing low temperatures. In this disclosure, the composite overwrapped pressure vessels using the disclosed epoxy formulations, in addition to withstanding the cryogenic temperatures, are capable of withstanding high temperatures, including but not limited to above or not more than 220° F., 240° F., 260° F., 280° F., 300° F., and 320° F. In an embodiment, the operating range of the composite overwrapped pressure vessel using the epoxy formulation of this disclosure has an operating temperature of any of the cryogenic temperature as the lower limit and any of the high temperatures as the upper limit. The composite overwrapped pressure vessel using the epoxy formulation of this disclosure can undergo temperature cycles between any low and high temperature limit. Furthermore, the composite overwrapped pressure vessel using the epoxy formulation of this disclosure can withstand operating pressures of at least 5000 psi, 5500 psi, 6000 psi, 6500 psi, 7000 psi, 7500 psi, 8000 psi, or 8500 psi. Burst pressure can be twice the operating pressure.

In an embodiment, the epoxy formulations in accordance with this disclosure can be incorporated into woven materials to make two-dimensional woven composites ("prepregs"). In another embodiment, the epoxy formulations of this disclosure can be used as liquid resins for vacuum assisted infusion, resulting in composites with good toughness in a wide temperature range. In another embodiment, the epoxy formulations of this disclosure can be used, directly or with modifications, as adhesives or sealants suitable for cryogenic application.

Figure 1:
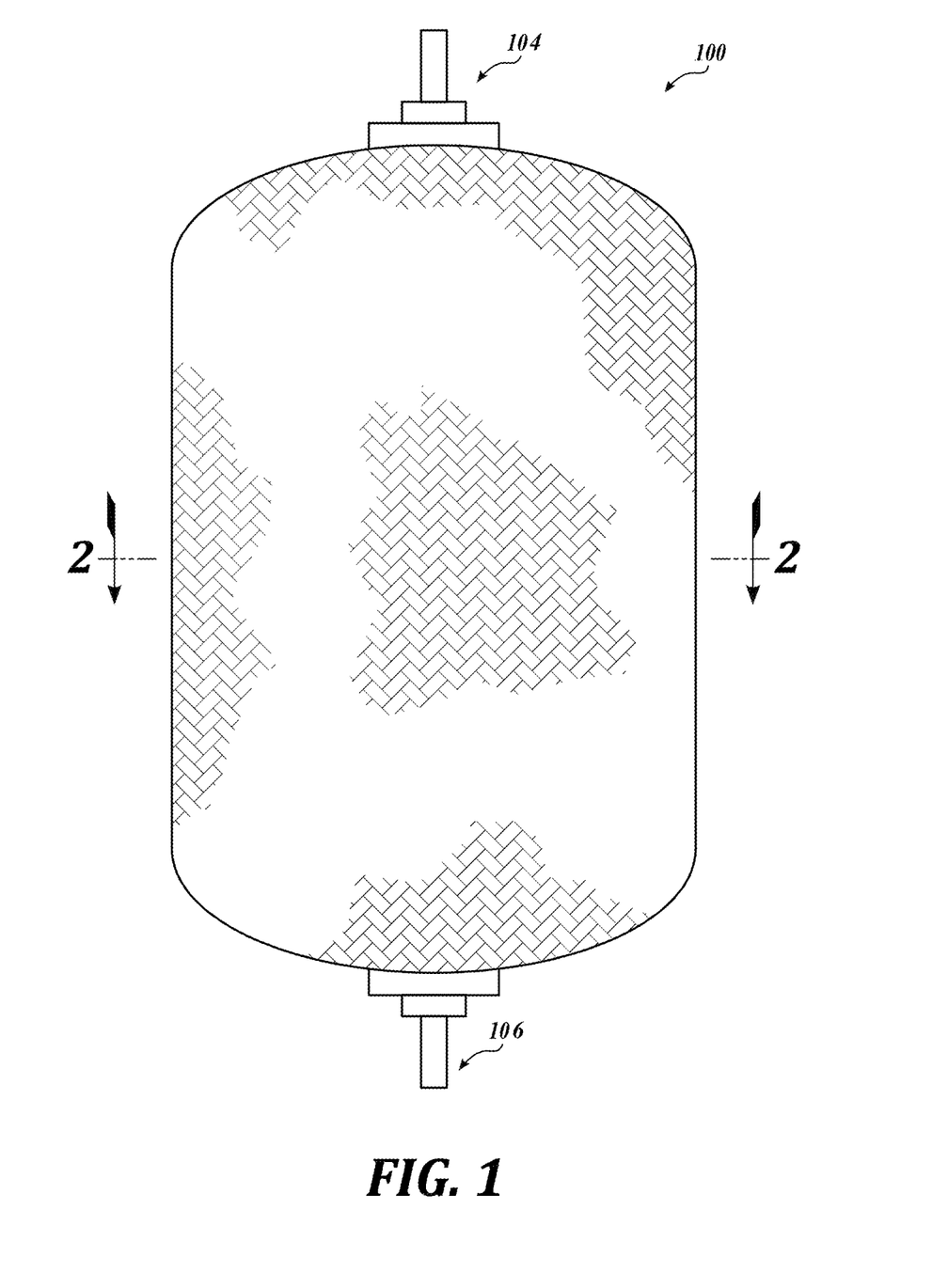
FIG. 1 is a diagrammatical illustration of a composite overwrapped pressure vessel.
Figure 2:
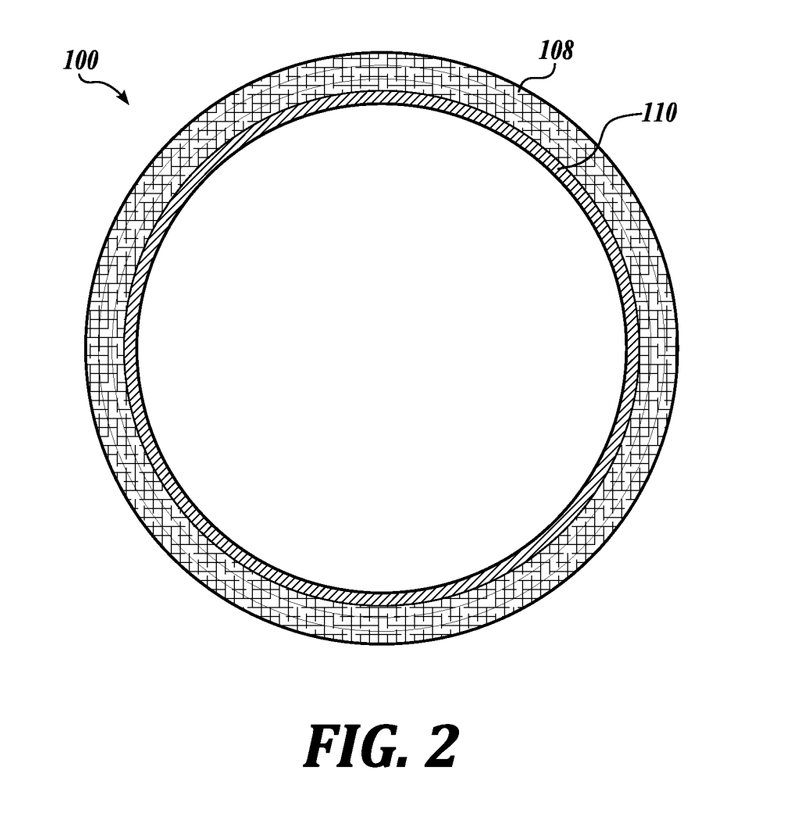
FIG. 2 is a diagrammatical illustration of a cross section of the composite overwrapped pressure vessel of FIG. 1.

FIG. 1 is a diagrammatical illustration of a composite overwrapped pressure vessel 100. FIG. 2 is a diagrammatical illustration of a cross section of the composite overwrapped pressure vessel of FIG. 1.

Referring to FIG. 2, the composite overwrapped pressure vessel 100 includes an inner liner 110 made of aluminum or alloys thereof, titanium or alloys thereof, or combinations. The inner liner 110 determines the capacity of the composite overwrapped pressure vessel 100. The inner liner 110 fully lines the interior of the composite overwrapped pressure vessel 100. For the composite overwrapped pressure vessel 100 of FIGS. 1 and 2, the inner liner 110 can include a central cylinder section with a dome section capping each end of the cylinder. Other composite overwrapped pressure vessels can be spherical. The cylinder can be rolled and welded from a flat sheet. The domes may be butt welded to the cylinder or slipped on to the end of the cylinder and then welded. One or both domes can be ported. In an embodiment, one dome is ported and the other dome is blind. In an embodiment, a threaded boss 104 is built into the ported dome and a bearing boss 106 is built into the blind dome. Both the threaded boss 104 and the bearing boss 106 are built along the axial centerline of the composite overwrapped pressure vessel 100. The threaded boss 104 can be used as a port for filling and emptying the composite overwrapped pressure vessel 100. The bearing boss 106 can be used in supporting the composite overwrapped pressure vessel in the launch vehicle in a manner configured to relieve any elongation of the composite overwrapped pressure vessel in the axial direction.

In an embodiment, the inner liner 110 including the cylinder section and domes, while made of metal, are not generally relied on for strength. A purpose of the metal liner 110 is to give the final shape to the composite overwrapped pressure vessel 100 by supporting the resin impregnated fibers 108 that are wrapped on the exterior of the liner 110.

In wrapping the metal liner 110 with the resin impregnated fibers 108 several methods can be employed. In an embodiment, an automated filament winding machine is used. The winding machine can control the angle of the filaments or tapes with respect to the composite overwrapped pressure vessel centerline. For example, the filaments or tapes may be laid at any angle with respect to the centerline, parallel to or perpendicular to the centerline, or in any combination. Multiple filaments may be laid down simultaneously. The overwrapping may be built up layer by layer to the finished thickness. Each layer can have the same or different fiber orientation. For example, hoop layers may be applied first followed by helical layers or hoop layers are alternated with helical layers. The filaments are impregnated with the epoxy formulation during the process of being laid down onto the liner 110 or any preceding layer. An adhesive can first be applied to the exterior of the inner liner 110 prior to the first application of the resin impregnated filaments.

After the wrapping of the composite is completed, the composite overwrapped pressure vessel can be placed in an oven to cure the resin. The cure profile can be adjusted to according to time and temperature.

While the general details of making a composite overwrapped pressure vessel are described, it is to be appreciated that composite overwrapped pressure vessels for use in launch vehicles undergo a significant amount of testing and design for vibration, shock, fatigue, the results of which are considered in the fabrication of the inner liner and the composite layer.

Based on the disclosure, non-limiting representative embodiments include the following, for example.

In one embodiment, a method of increasing the glass transition point of a cured epoxy comprising a glycidyl ether resin and a polyetheramine, wherein the method comprises including 1,8-diamino-p-menthane as an additional hardener for curing the epoxy.

In one embodiment, the ratio of polyetheramine to 1,8-diamino-p-menthane is 1:2.5±10% by weight.

In one embodiment, the glass transition point of the cured epoxy is at least 280° F.

In one embodiment, an uncured epoxy formulation, comprises a glycidyl ether resin; and a hardener including a polyetheramine and 1,8-diamino-p-menthane.

In one embodiment, the glycidyl ether resin is 2,2-bis[p-(2,3-epoxypropoxy)phenyl]propane.

In one embodiment, the ratio of the polyetheramine to 1,8-diamino-p-menthane is 1:2.5±10% by weight.

In one embodiment, the ratio of the glycidyl ether resin to hardener is 100:28±10% by weight.

In one embodiment, the viscosity of uncured epoxy is greater than 3,000 cps.

In one embodiment, the gel life of uncured epoxy is at least 24 hours at ambient temperature (about 73° F.) and at least 10 hours at 120° F.

In one embodiment, the uncured epoxy formulation comprises an additive.

In one embodiment, the additive is propoxylated glycerin triglycidyl ether or brominated bisphenol A diglycidyl ether.

In one embodiment, the glycidyl ether resin and the hardener of a polyetheramine and 1,8-diamino-p-menthane comprise about 100% by weight of the epoxy formulation.

In one embodiment, the cured epoxy formulation comprises the cured product of a glycidyl ether resin, and a hardener of a polyetheramine and 1,8-diamino-p-menthane.

In one embodiment, the cured epoxy has a glass transition point at about 280 F or greater.

In one embodiment, the cured epoxy comprises a density of 1.14 g/cm$^3$.

In one embodiment, the cured epoxy comprises a hardness of 82 shore D.

In one embodiment, the cured epoxy comprises a tensile strength of about 22.6+/−2.6 ksi at −320° F.

In one embodiment, the cured epoxy comprises a tensile elongation of about 2.6+/−0.5% at −320° F.

In one embodiment, the cured epoxy further comprises fibers.

In one embodiment, the fibers comprise carbon, glass, aromatic polyamide, or a combination thereof.

In an embodiment, about 100% by weight of the cured or uncured epoxy formulation comprises a glycidyl ether resin and 1,8-diamino-p-menthane.

In one embodiment, the ratio of the glycidyl ether resin to 1,8-diamino-p-menthane is 100:32±10% by weight.

In one embodiment, about 100% by weight of a cured or uncured epoxy formulation comprises a glycidyl ether resin; and 4,4'-methylenebis(2-methylcyclohexylamine).

In one embodiment, the ratio of the glycidyl ether resin to 4,4'-methylenebis(2-methylcyclohexylamine) is 100:32±10% by weight.

In one embodiment, a composite overwrapped pressure vessel comprises a metal liner overwrapped with fibers impregnated with the cured product of a glycidyl ether resin; and a hardener of a polyetheramine and 1,8-diamino-p-menthane.

In one embodiment, the composite overwrapped pressure vessel has a burst pressure of at least 8,000 psi.

Example 1

Uncured Epoxy Formulation

A known epoxy formulation was prepared having the resin E1, 2,2-bis[p-(2,3-epoxypropoxy)phenyl]propane as Part A and poly[oxy(methyl-1,2-ethanediyl)],α-hydro-ω-(2-aminomethylethoxy)-ether with 2-ethyl-2-(hydroxylmethyl)-1,3-propanediol(3:1) as the hardener Part B and mixed at a ratio of Part A:Part B of 100:44 by weight.

An epoxy formulation according to the disclosure has the resin E1 2,2-bis[p-(2,3-epoxypropoxy)phenyl]propane as Part A and the hardener Part B includes amines A1, XTJ-568 and A6, 1,8-diamino menthane at a ratio A1:A6 of 1:2.5 by weight. Then, the resin part A with the hardener part B (A1 and A6) were mixed at a ratio of 100:28 by weight.

The following properties were determined for the conventional epoxy formulation and the epoxy formulation of this disclosure.

| Property | Disclosure Example | Comparative Example |
| --- | --- | --- |
| Part A | 2, 2-bis[p-(2,3-epoxypropoxy)phenyl]propane | 2, 2-bis[p-(2,3-epoxypropoxy)phenyl]propane |
| Part B | A1:XTJ-568<br>A6: 1,8-diamino-p-menthane | A2: poly[oxy(methyl-1,2-ethanediyl)],α-hydro-ω-(2-aminomethylethoxy)-ether with 2-ethyl-2-(hydroxylmethyl)-1,3-propanediol(3:1) |
| Hardener A1:A6 | 1:2.5 | |
| Part A:Part B | 100:28 | 100:44 |
| Viscosity (cps) | 1500-3000 | >3000 |
| Gel life (h, ambient) | >24 | |
| Gel life (h, 120F) | >10 | |

Example 2

Cured Epoxy Formulation

The disclosure and comparative epoxy formulations of Example 1 were made into test coupons and cured. The following properties were determined for the conventional cured epoxy formulation and the cured epoxy formulation of this disclosure.

Parts A and B were thoroughly mixed, followed by further mixing and degassing in a degasser/mixer device before casting into an aluminum mold (ASTM 638 type IV) in a dogbone shape. The dogbone test samples were milled to desired thickness of about 0.125 inches and a width of about 0.23 inches and polished in a polishing well.

The tensile strength properties are determined in accordance with ASTM-D638-14. Testing commenced after a minimum soak time of 5 minutes at the test temperature. The test was conducted at a rate of 0.05 in/min until failure. Tests performed at −320 utilized an insulated container with liquid nitrogen. The loading was provided by an Instron electromechanical device (Model 4485). Strain measurements were provided by an extensometer (MTS Model 634.11E-21).

| Property | Disclosure Example | Comparative Example |
|---|---|---|
| Cure profile | 265 F. max cure w/ 300 F. post cure | 250 F. max cure |
| Tg (F) | 280 | 180 |
| Density (g/cm³) | 1.14 | |
| Hardness (shore D) | 82 | |
| Tensile strength (−320 F.)(ksi) | 22.6 +/− 2.6 | 22.7 +/− 4.1 |
| Tensile elongation (−320 F.)(%) | 2.6 +/− 0.5 | 2.5 +/− 0.4 |
| Tensile strength (ambient)(ksi) | 11.4 +/− 0.4 | 9.3 +/− 0.1 |
| Tensile strength (180 F.)(ksi) | 1.3 | |
| Tensile strength (200 F.)(ksi) | 0.7 | |
| Tensile strength (220 F.)(ksi) | 22.6 +/− 2.6 | 6.7 +/− 0.4 |
| Tensile strength (240 F.)(ksi) | 22.6 +/− 2.6 | 11.4 +/− 0.4 |

Example 3

Composite Overwrapped Pressure Vessel Burst Pressure

The disclosure and comparative epoxy formulations of Example 1 were used to fabricate sample composite overwrapped pressure vessels to test burst pressure at cryogenic and hot temperatures. The testing follows the publication "HIGH PRESSURE COPVS FOR CRYOGENIC STORAGE APPLICATIONS," 42$^{nd}$ AIAA/ASME/SAE/SEEE Joint Propulsion Conference & Exhibit, 9-12 Jul. 2006, Sacramento, Calif.

TABLE 1

| Baseline Geometry | |
|---|---|
| | Standard ASTM D-2585 |
| Mandrel configuration | Compacted sand |
| Mandrel O.D. | 5.75 |
| Wind sequence | XOOXOO |
| Wind tension (per tow) | 10 lb$_f$ |
| Helical angle (average) | 11 degrees |
| # of tows | 2 |
| Hoop band width | 018 inches |
| Helical band width | 0.20 inches |
| Typical burst psig (T-1000) | 5,100 psi |

The COPVs were tested for hydrostatic burst pressure increasing the pressure at a rate of 75 to 125 psi/sec at both ambient and hot temperatures.

For liquid nitrogen testing, the COPVs were filled with liquid nitrogen and allowed to soak for 15 to 20 minutes before testing.

The results are shown below.

| Property | Disclosure Example | Comparative Example |
|---|---|---|
| Ave Burst Pressure (Ambient) (psi) | 8849 (σ = 142) Data size: 10 | 8575 (σ = 356) Data size: 2 |
| Ave Burst Pressure (liq. N$_2$) (−320 F.) (psi) | 8361 (σ = 160) Data size: 30 | 8295 (σ = 134) Data size: 2 |
| Ave Burst Pressure (240 F.) (psi) | 8048 (σ = 103) Data size: 30 | 7465 (σ = 161) Data size: 2 Test temp. 200 F. |

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of increasing the glass transition point of a cured epoxy comprising a glycidyl ether resin and a polyetheramine, the method comprising:
   including 1,8-diamino-p-menthane as an additional hardener for curing the epoxy,
   wherein a ratio of polyetheramine to 1,8-diamino-p-menthane is 1:2.5±15% by weight.

2. The method of claim 1, wherein the ratio of polyetheramine to 1,8-diamino-p-menthane is 1:2.5±10% by weight.

3. The method of claim 1, wherein the glass transition point is at least 280° F.

4. An uncured epoxy formulation, comprising:
   a glycidyl ether resin; and
   a hardener including a polyetheramine and 1,8-diamino-p-menthane,
   wherein a ratio of the polyetheramine to 1,8-diamino-p-menthane is 1:2.5±15% by weight.

5. The uncured epoxy formulation of claim 4, wherein the glycidyl ether resin is 2,2-bis[p-(2,3-epoxypropoxy)phenyl] propane.

6. The uncured epoxy formulation of claim 4, wherein the ratio of the polyetheramine to 1,8-diamino-p-menthane is 1:2.5±10% by weight.

7. The uncured epoxy formulation of claim 4, wherein a ratio of the glycidyl ether resin to hardener is 100:28±10% by weight.

8. The uncured epoxy formulation of claim 4, having a viscosity greater than 3,000 cps.

9. The uncured epoxy formulation of claim 4, having a gel life of at least 24 hours at ambient temperature (about 73° F.) and a gel life of at least 10 hours at 120° F.

10. The uncured epoxy formulation of claim 4, further comprising an additive.

11. The uncured epoxy formulation of claim 10, wherein the additive is propoxylated glycerin triglycidyl ether or brominated bisphenol A diglycidyl ether.

12. The uncured epoxy formulation of claim 4, wherein the glycidyl ether resin and the hardener of the polyetheramine and 1,8-diamino-p-menthane account for about 100% by weight of the uncured epoxy formulation.

13. A cured epoxy formulation, comprising:
   the cured product of a glycidyl ether resin, and a hardener of a polyetheramine and 1,8-diamino-p-menthane, wherein a ratio of the polyetheramine to 1,8-diamino-p-menthane is 1:2.5±15% by weight.

14. The cured epoxy formulation of claim 13, having a glass transition point at about 280° F. or greater.

15. The cured epoxy formulation of claim 13, comprising a density of 1.14 g/cm3.

16. The cured epoxy formulation of claim 13, comprising a hardness of 82 shore D.

17. The cured epoxy formulation of claim 13, comprising a tensile strength of about 22.6+/−2.6 ksi at −320° F.

18. The cured epoxy formulation of claim 13, comprising a tensile elongation of about 2.6+/−0.5% at −320° F.

19. The cured epoxy formulation of claim 13, further comprising fibers selected from the group consisting of carbon, glass, aromatic polyamide, and a combination thereof.

20. A composite overwrapped pressure vessel, comprising:
- a metal liner overwrapped with fibers impregnated with the cured product of a glycidyl ether resin; and a hardener of a polyetheramine and 1,8-diamino-p-menthane, wherein a ratio of the polyetheramine to 1,8-diamino-p-menthane is 1:2.5±15% by weight.

21. The composite overwrapped pressure vessel of claim 20, having a burst pressure of at least 8,000 psi.

* * * * *